United States Patent
Passmann et al.

(10) Patent No.: US 11,772,620 B2
(45) Date of Patent: Oct. 3, 2023

(54) HYDRAULIC MOTOR VEHICLE BRAKE SYSTEM, METHOD FOR OPERATING THE SAME AND CONTROL UNIT FOR THIS

(71) Applicant: ZF Active Safety GmbH, Koblenz (DE)

(72) Inventors: Andreas Passmann, Hilgert (DE); Stefan Kraemer, Illerich (DE)

(73) Assignee: ZF Active Safety GmbH, Koblenz (DE)

( * ) Notice: Subject to any disclaimer, the term of this patent is extended or adjusted under 35 U.S.C. 154(b) by 394 days.

(21) Appl. No.: 17/123,240

(22) Filed: Dec. 16, 2020

(65) Prior Publication Data

US 2021/0179044 A1 Jun. 17, 2021

(30) Foreign Application Priority Data

Dec. 17, 2019 (DE) .......................... 102019219793.0

(51) Int. Cl.
*B60T 8/94* (2006.01)
*B60T 13/14* (2006.01)
(Continued)

(52) U.S. Cl.
CPC ...... *B60T 8/94* (2013.01); *B60T 7/12* (2013.01); *B60T 8/17616* (2013.01);
(Continued)

(58) Field of Classification Search
CPC ........ B60T 8/94; B60T 13/145; B60T 13/662; B60T 2270/10; B60T 7/12; B60T 2270/402; B60T 2270/403; B60T 8/17616
See application file for complete search history.

(56) References Cited

U.S. PATENT DOCUMENTS

| 2010/0045099 A1 | 2/2010 | Burkhard et al. |
| 2016/0185331 A1 | 6/2016 | Jeon et al. |

(Continued)

FOREIGN PATENT DOCUMENTS

DE        19929157        12/2000

OTHER PUBLICATIONS

German Patent No. DE 102020202556 to Hummel et al published on Sep. 2, 2021.*

*Primary Examiner* — Pamela Rodriguez
(74) *Attorney, Agent, or Firm* — Robert James Harwood (57) ABSTRACT

A hydraulic motor vehicle brake system is specified with a device for generating a hydraulic fluid pressure. The device comprises an electrically controllable actuator and a piston in a pressure chamber, which is movable by means of the electrically controllable actuator for changing a hydraulic fluid pressure in the pressure chamber. The brake system also comprises a wheel brake pressure control device with a reservoir for the storage of hydraulic fluid discharged from a motor vehicle wheel brake in a pressure reduction phase, wherein the reservoir is fluidically coupled to the pressure chamber. A control system of the brake system is designed to output a control signal for the actuator in the event of a detected loss of function of the control device and in the event of a detected critical filling volume of the reservoir with hydraulic fluid during operation of the control device, which causes the piston to be driven back for pressure reduction in the pressure chamber with suction of hydraulic fluid from the reservoir.

16 Claims, 3 Drawing Sheets

(51) Int. Cl.
*B60T 17/22* (2006.01)
*B60T 13/66* (2006.01)
*B60T 7/12* (2006.01)
*B60T 8/1761* (2006.01)

(52) U.S. Cl.
CPC .......... *B60T 13/145* (2013.01); *B60T 13/662* (2013.01); *B60T 17/22* (2013.01); *B60T 2270/10* (2013.01); *B60T 2270/402* (2013.01); *B60T 2270/403* (2013.01)

(56) References Cited

U.S. PATENT DOCUMENTS

| | | |
|---|---|---|
| 2017/0001612 A1 | 1/2017 | Bauer et al. |
| 2020/0207321 A1* | 7/2020 | Plewnia ................ B60T 13/148 |
| 2021/0162966 A1* | 6/2021 | Passmann ............... B60T 8/171 |

* cited by examiner

HYDRAULIC MOTOR VEHICLE BRAKE SYSTEM, METHOD FOR OPERATING THE SAME AND CONTROL UNIT FOR THIS

RELATED APPLICATION

This application claims priority to German Patent Application No. 102019219793.0 filed Dec. 17, 2019, the disclosure of which is incorporated herein by reference in its entirety.

BACKGROUND OF THE INVENTION

The present disclosure generally concerns the field of hydraulic motor vehicle brake systems. Specifically, aspects related to the operation of such a brake system in the event of a loss of function of a wheel brake pressure control device are described.

Well-known hydraulic vehicle brake systems designed as brake-by-wire (BBW) systems or equipped with an electric brake boost (EBB) system include an electrically controllable actuator that generates hydraulic pressure on the wheel brakes of the vehicle during service braking mode or boosts a hydraulic pressure generated by the driver. For this purpose, a vehicle deceleration demanded by the driver on a brake pedal is detected by sensor and converted into a control signal for the actuator.

Such brake systems usually also include a master cylinder mechanically actuated by means of the brake pedal, by means of which hydraulic fluid can be conveyed to the wheel brakes. The actuation by means of the brake pedal creates a redundancy with regard to the electrically controllable BBW or EBB system that is desirable for reasons of operational safety.

Modern brake systems also include driving dynamics control (also called electronic stability control, ESC), which includes, for example, one or more functions such as drive slip control (ASR), an anti-lock brake system (ABS) or electronic braking force distribution (EBV). These controllers are at least partly based on the control of a wheel brake pressure.

There are demands to also design the driving dynamics control system redundantly. In other words, even in the event of a loss of function of the driving dynamics control system, at least rudimentary driving dynamics control should still be possible in order to be able to at least partially maintain the vehicle stability or the deceleration capability.

Brake systems for autonomous or semi-autonomous vehicles must also be designed redundantly, especially since the driver is not necessarily in the vehicle (for example in a remote controlled parking, RCP, operation) or cannot intervene immediately in vehicle operation. The driving dynamics control system, and in particular the ABS, is of great importance in this context. Therefore, the ABS is subject to high demands with regard to its availability. In the case of a conventional vehicle, the ABS can simply be switched off in the event of a fault and the driver can be alerted to this shutdown in order to encourage him to drive more cautiously. In autonomous or semi-autonomous driving, on the other hand, the vehicle system remains fully responsible for a long period of time or even permanently.

A possible loss of function in a driving dynamics control system is the failure of a pump for hydraulic fluid, for example due to failure of the pump motor. In a driving dynamics control system such as the ABS, the pump can be used to empty a reservoir for hydraulic fluid discharged from a wheel brake. If the reservoir is no longer emptied due to the pump failure, control is only possible for a very short time until the reservoir is completely filled. When the reservoir is completely filled, the brake pressure on the corresponding wheel can no longer be removed, which is not desirable for safety reasons.

In the conventional driving mode, it is known that in the event of a failure of the pump for emptying the reservoir, the control of the wheels on the front axle should be cut off and a simplified control for the wheels on the rear axle should be used to prevent oversteering. However, this simplified strategy can only ensure limited vehicle stability. For example, braking and steering with a low coefficient of friction is no longer possible. However, this limited vehicle stability is not acceptable in many cases, such as autonomous or semi-autonomous driving.

SUMMARY OF THE INVENTION

The present disclosure is based on the object of specifying a motor vehicle brake system which provides vehicle stability even in the event of a loss of function of a wheel brake pressure control device.

According to a first aspect, a hydraulic motor vehicle brake system with a device for generating a hydraulic fluid pressure is specified. The device comprises an electrically controllable actuator and a piston in a pressure chamber, which is movable by means of the electrically controllable actuator for changing a hydraulic pressure in the pressure chamber. The brake system also comprises a wheel brake pressure control device with a reservoir for the storage of hydraulic fluid discharged from a motor vehicle wheel brake during a pressure reduction phase, wherein the reservoir can be fluidically coupled to the pressure chamber, and a control system that is designed, in the case of a detected loss of function of the control device and a detected critical filling of the reservoir with hydraulic fluid during an operation of the control device, to output a control signal for the actuator, which causes the piston to be driven back for pressure reduction in the pressure chamber with suction of hydraulic fluid from the reservoir.

The electromechanical actuator may have an electric motor as well as a gearbox following the electric motor on the output side, which is indirectly or directly coupled to the piston. The indirect action can be carried out in a hydraulic manner, for example, by the gearbox acting on a plunger arrangement, the output of which is hydraulically coupled to an input of the master cylinder.

By moving the piston in the pressure chamber, the hydraulic fluid pressure in the pressure chamber as well as the pressure in fluid lines connected to the pressure chamber or associated with the pressure chamber can be changed in a known manner. The pressure chamber can be or will be fluidically coupled to one or more vehicle brakes via the fluid lines. In this way, the hydraulic fluid pressure in the pressure chamber can be transmitted to the vehicle brakes as a braking pressure.

The piston movable by means of the electrically controllable actuator may be a master cylinder piston or a piston that is or is able to be indirectly or directly coupled to the master cylinder piston.

The electrically controllable actuator can be part of an EBB system or part of a BBW system. In the case of the EBB system, the force applied by the driver to the brake pedal is boosted by the electrically controllable actuator. In the case of the BBW system, the actual service brake force is generated by means of the electrically controllable actuator. The brake pedal may be mechanically decoupled from the piston in the BBW mode, for example. The mechanical decoupling can be removed, for example in the event of a fault of the BBW system (push-through, PT, mode).

In both cases, the service brake force can be demanded by a driver on a brake pedal. In this process, the deceleration demanded by means of the brake pedal can be detected by sensor, wherein the actuator is then electrically controlled according to the sensor signals. The service brake force may also be demanded by a system for autonomous or semi-autonomous driving, regardless of the actuation or even the presence of a brake pedal.

The wheel brake pressure control device may be set up to regulate the braking pressure on a single vehicle wheel by a short sequence of pressure holding, pressure build-up and pressure reduction phases, for example, in order to prevent locking or spinning of one or more vehicle wheels.

The reservoir for storing hydraulic fluid is used for the temporary accommodation of hydraulic fluid which is discharged from a motor vehicle wheel brake. During a pressure build-up phase, the hydraulic fluid can be discharged from the reservoir again to increase the wheel brake pressure. As a result, the reservoir is emptied and thus again has sufficient free volume to accommodate hydraulic fluid discharged in a pressure decrease phase.

If the reservoir is no longer emptied regularly due to a loss of function of the control device, wheel brake pressure control is only possible for a short time until the reservoir is completely filled, and wheel brake pressure cannot continue to be reduced. If such a loss of function of the control device is detected, the control intervention is carried out normally until the reservoir is filled with a critical filling volume of hydraulic fluid. The control system is set up in such a way that in this case, i.e. in the case of a detected loss of function of the control device and a detected critical filling volume of the reservoir with hydraulic fluid, a control signal is output which causes the piston in the pressure chamber to be driven back. The pressure reduction in the pressure chamber has the effect that hydraulic fluid is sucked from the reservoir into the pressure chamber. The reservoir is temporarily fluidically coupled to the pressure chamber if necessary for this purpose, for example by opening a previously closed valve.

If the reservoir is emptied or partially emptied, the regular wheel brake pressure control intervention can be continued. It may be that no interruption of the control intervention is required at all. The control intervention and emptying of the reservoir can therefore be carried out in parallel over time.

The short-term pressure release sequence described above can thus compensate a loss of function of the control device without any restrictions on the vehicle stability which is achieved by means of the control system having to be accepted as a result. This is particularly important in an autonomous mode of driving in which the driver cannot make control interventions.

In one variant, the detected loss of function is the failure of a pump arrangement, which is provided to discharge hydraulic fluid from the reservoir. For example, the electric motor or a gearbox downstream of the electric motor may be defective.

In this variant, the wheel brake pressure control device may be designed so that the hydraulic fluid in the reservoir is discharged by means of the pump arrangement during a pressure build-up phase to increase the wheel brake pressure. The reservoir is for example regularly emptied or at least partially emptied during a pressure build-up phase. Alternatively or additionally, it is possible that the reservoir is also at least partially emptied by means of the pump arrangement independently of a pressure build-up phase. This may be the case, for example, if it is detected that a critical level in the reservoir is reached or exceeded and/or independently of the level in the reservoir to refill empty fluid lines with hydraulic fluid and thus prevent a decrease in acceleration.

The reservoir may be a pressureless storage device or a pressure storage device. In one implementation, the reservoir is a pressure storage device, in particular a conventional low pressure storage device (for example with a piston subjected to spring force or an elastic membrane). The design as a pressure storage device supports the return flow of hydraulic fluid into the pressure chamber when the piston is driven back.

In one variant, the wheel brake control device is set up such that the reservoir can be fluidically coupled to the pressure chamber in such a way that at least part of the hydraulic fluid sucked in when the piston is being driven back flows through a bypass line bypassing the pump arrangement. This makes it possible to increase the volumetric flow of the hydraulic fluid sucked in compared to a variant in which the hydraulic fluid sucked in flows exclusively via the pump arrangement and the check valves assigned to the pump arrangement. According to this variant, in order to achieve a maximum volumetric flow of the hydraulic fluid sucked in, the wheel brake control device can be set up so that the reservoir can be fluidically coupled to the pressure chamber so that the hydraulic fluid sucked in when the piston is driven back flows exclusively through the bypass line.

The detection of reaching or exceeding the critical filling volume can be carried out in various ways.

In one variant, the control system is designed to detect reaching or exceeding the critical filling volume of the reservoir with hydraulic fluid on the basis of a slip detection for a vehicle wheel. If a reservoir assigned to the front and/or rear wheel brakes can no longer be emptied during ABS control, only a short ABS control period is possible until the reservoir is completely filled, and the wheel pressure can no longer be reduced. This can lead to locking of the wheel or wheels, which is accompanied by wheel slip. On the basis of a wheel slip determination, in particular on the basis of the wheel slip variation with time, it can be determined whether the wheel brake pressure control intervention can be carried out correctly or not. Thus, on the basis of the characteristic wheel slip variation for at least one vehicle wheel, reaching and/or exceeding a critical filling volume of the respective reservoir can be detected by the control system.

A characteristic wheel slip profile, which indicates a reservoir filled with hydraulic fluid, can be a rapid rise of a wheel slip value from a predetermined wheel slip value. The predetermined wheel slip value can be a known value at which a braking force maximum is usually achieved, for example.

The slip detection can be carried out on the basis of at least one parameter measured on the respective vehicle wheel. The parameters can be measured by means of wheel sensors. The wheel signals detected by the wheel sensors (for example wheel revolution rates, wheel speeds) can indicate the revolution rate or speed of the corresponding wheel. Based on the wheel signals, in particular a wheel-related slip detection can be carried out by the control system.

In another variant, the control system is designed to detect reaching the critical filling volume of the reservoir on the basis of a mathematical model depicting the filling quantity. The model can be based on the assumption that the difference in the volumetric flow of hydraulic fluid flowing from the pressure chamber towards the brakes (input volumetric flow) and the volumetric flow of hydraulic fluid which is discharged from the brakes back into the pressure chamber (output volumetric flow) corresponds to the filling volume of the reservoir. The output parameters of the model for determining the input volumetric flow can be characteristic parameters of one or more valves, through which the pressure chamber can be coupled to the wheel brakes, such as the control time point of the corresponding valve or valves, or the duration of the time for which the corresponding valve or valves are opened, as well as a signal of a pressure sensor which is arranged in the input line or output line of the pressure chamber. The input parameter or an input parameter of the model for the control of the output volumetric flow may be the flow rate of a pump, via which hydraulic fluid is discharged from the brakes back towards the pressure chamber. For example, the pump revolution rate is representative of the flow rate.

The different variants can be used alternatively. They can also be used together. In this way, for example, a redundancy can be produced for the case in which the detection of the critical filling volume according to one variant is error-prone.

In one variant, the control system is also designed to detect a loss of function of the control device. For this purpose, the control system can receive and evaluate appropriate sensor signals and/or perform model calculations (for example on the basis of sensor signals).

The control system may be designed to cause normal wheel brake pressure control of the control device after emptying or partly emptying the reservoir below the critical filling volume by sucking in hydraulic fluid when the piston is being driven back into the pressure chamber. With the disclosed brake system it is thus possible to compensate for a detected loss of function of the control device, in particular a failure of the pump arrangement, by interrupting the normal control for a short time and controlling the piston is to drive it back. If sufficient free volume is available in the reservoir again, the normal wheel brake pressure control can be continued.

In one variant, the electrically controllable actuator is part of an EBB system. In this case, the actuator can be controlled in particular in an autonomous driving mode. The piston can then be driven back in this variant by means of the actuator of the EBB system, which is (in any case also) provided for braking force boosting. If the autonomous driving mode is terminated in this variant and the driver takes over the driving operation again, and thus also the braking operation by operating the pedal, no further pressure release sequence is carried out in one embodiment of this variant, since the pedal should not be loaded.

In one variant, the wheel brake pressure control device comprises an ABS device. In addition or alternatively, an ESC device may be included in the control device.

A second aspect concerns a method of operating a hydraulic vehicle brake system which has a device for generating a hydraulic pressure with an electrically controllable actuator and a piston in a pressure chamber which can be moved by means of the electrically controllable actuator for changing a hydraulic pressure in the pressure chamber, as well as a wheel brake pressure control device with a reservoir for the storage of hydraulic fluid discharged from a motor vehicle wheel brake in a pressure-reducing phase, wherein the fluid reservoir is fluidically connected to the pressure chamber. The method includes the electrical control of the actuator in the event of a detected loss of function of the control device and a detected critical filling volume of the reservoir with hydraulic fluid during operation of the control system, so that the piston is driven back into the pressure chamber for pressure reduction in the pressure chamber with suction of hydraulic fluid from the reservoir.

In one variant of the second aspect, normal wheel brake pressure control of the control device is caused by sucking in hydraulic fluid during retraction of the piston in the pressure chamber after emptying or partial emptying of the reservoir to below the critical filling quantity.

The method may further include steps that correspond to the functions of the control system described herein.

Also specified is a control unit or a system of multiple control units, comprising at least one processor and at least one memory, wherein the at least one memory contains program code for performing the method presented here when run on at least one processor.

BRIEF DESCRIPTION OF THE DRAWINGS

Further aspects, details and advantages of the present disclosure can be found in the following description of exemplary embodiments with reference to the figures. In the figures.

DESCRIPTION

Figure 1:
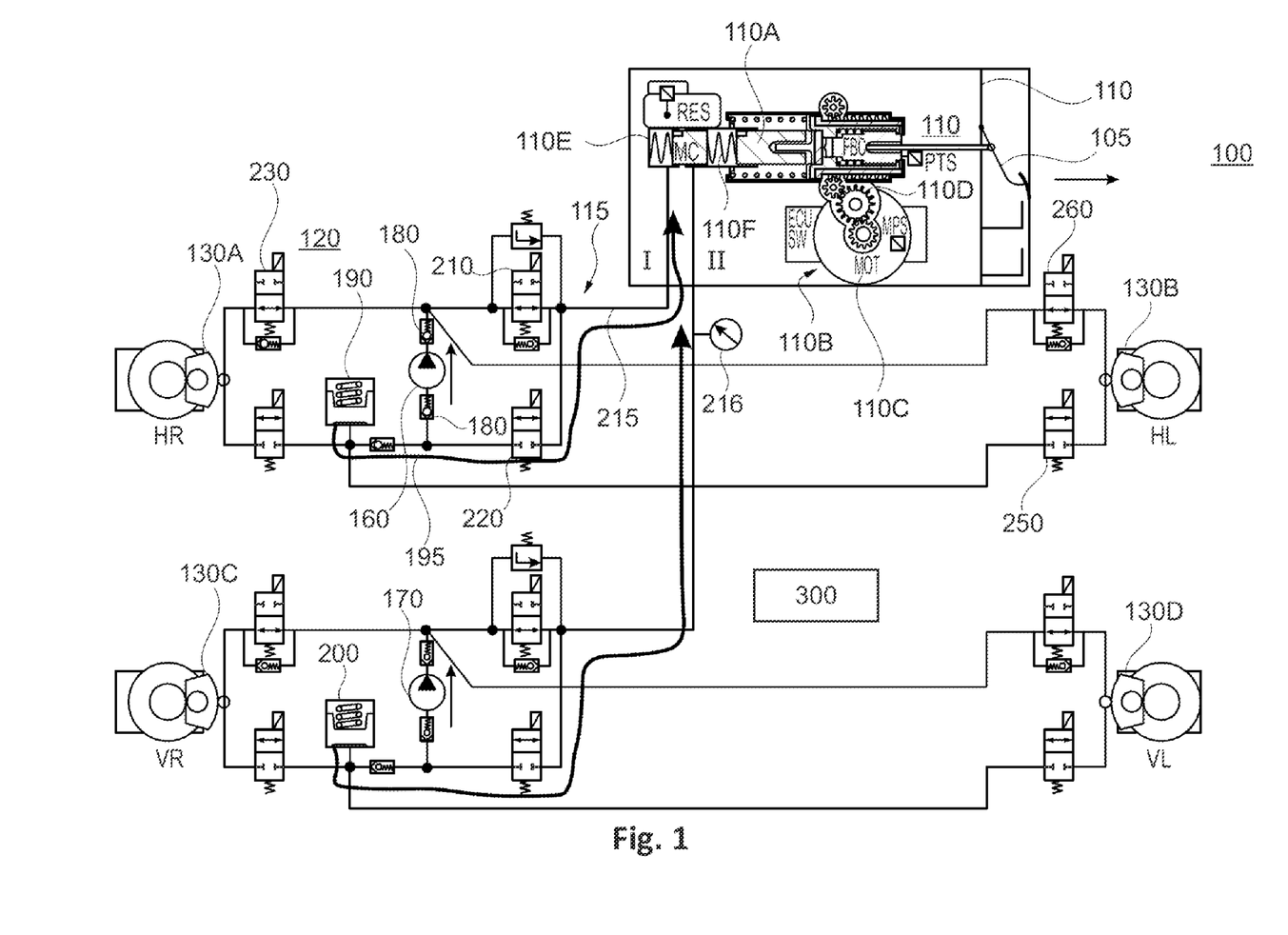
FIG. 1 shows an exemplary embodiment of a motor vehicle brake system.

The hydraulic diagram of an exemplary embodiment of a hydraulic brake system 100 is shown in FIG. 1.

The brake system 100 according to FIG. 1 comprises an assembly 110 for hydraulic pressure generation that can be coupled (here: is coupled) to a brake pedal 105 as well as a hydraulic control module 120 (also called a hydraulic control unit, HCU) with two separate brake circuits I. and II.

The brake system 100 also comprises four wheel brakes 130. Two of the four wheel brakes 130 are assigned to the brake circuit I., while the other two wheel brakes 130 are assigned to the brake circuit II. The assignment of the wheel brakes 130 to the brake circuits I. and II. is carried out according to a division by axle in such a way that the wheel brakes 130A and 130B on the right rear wheel (HR) or on the left rear wheel (HL) are assigned to the brake circuit I., while the wheel brakes 130C and 130D on the right front wheel (VR) and on the left front wheel (VL) are assigned to the brake circuit II. The wheel brakes 130 can alternatively be distributed to the brake circuits I. and II. according to a diagonal distribution.

The assembly 110 for hydraulic pressure generation comprises a piston, here a master cylinder-tandem piston 110A, and can be operated in principle according to the EBB principle and/or the BBW principle. In FIG. 1, the assembly 110 is operated in accordance with the EBB principle. For this purpose, an electrically controllable actuator 110B is installed in the assembly 110, which functions as part of a hydraulic pressure generator and which is designed to boost a hydraulic pressure for at least one of the two brake circuits I. and II. In the example shown here, the electrically controllable actuator 110B is designed to boost a hydraulic pressure for both brake circuits I. and II. The electrically controllable actuator 110B comprises an electric motor 110C and a mechanical gearbox 110D, by means of which the electric motor 110C acts on the tandem piston 110A for hydraulic pressure generation.

The tandem piston 110A is movable in a pressure chamber 110F filled with hydraulic fluid. By moving the tandem piston 110A in the pressure chamber 110F, the hydraulic fluid pressure in the pressure chamber 110F can be changed in a known manner, as well as optionally the pressure in lines 115 that are or can be connected to the pressure chamber 110F.

The assembly 110 also has a reservoir 110G for storing hydraulic fluid, which in the event of a deceleration demand and/or during wheel brake pressure control can pass into the pressure chamber 110F and from there via the lines 115 to the corresponding wheel brake 130 to increase the brake pressure. Conversely, the reservoir 110G can also be used to accommodate hydraulic fluid discharged from the wheel brake 130 again.

In addition to the actuator 110B, a hydraulic pressure can be built up on the wheel brakes 130 by operation of the brake pedal 105, which is also mechanically coupled to the tandem piston 110A. In the EBB implementation, the actuator 110B is used to boost the pressure generated by the brake pedal 105.

The HCU 120 comprises a two-circuit wheel brake pressure control device in the present example for carrying out control interventions on the wheel brakes 130. The wheel brake pressure control device may include an ABS and/or ESC control device. In other exemplary embodiments, the wheel brake pressure control device can also be a single-circuit device.

Specifically, the two-circuit wheel brake pressure control system according to FIG. 1 comprises a first electrically controllable pump arrangement 160 in the first brake circuit I. and a second electrically controllable pump arrangement in the second brake circuit II. Each of the two pump arrangements 160, 170 comprises an electric motor and a pump actuated by the electric motor. Each of the two pumps of the pump arrangements 160, 170 can be designed as a multi-piston pump, as a gearwheel pump or otherwise. Each pump of the pump arrangements 160, 170 blocks opposite to its transport direction, which is represented by an arrow, as represented by means of the shut-off valves 180 at the output and input of the pump arrangement 160, 170. Since the revolution rate of each of the electric motors is adjustable, the delivery rate of each of the pumps of the pump arrangements 160, 170 can be adjusted by corresponding control of the associated electric motor.

The hydraulic fluid can be stored in three reservoirs 110G, 190, 200. While the reservoir 110G already described above is a pressureless reservoir, which forms part of the assembly 110, the other two reservoirs 190, 200 are each installed as pressure storage devices (for example as low pressure storage devices, also called low pressure accumulators, LPA) in one of the two brake circuits I., II. Specifically, the other two reservoirs 190, 200 are provided, among other things, to store hydraulic fluid which is discharged at one or more of the wheel brakes 130 to reduce the wheel brake pressure during a wheel brake pressure control intervention.

The two pump arrangements 160 and 170 are each able to suck in hydraulic fluid from the assigned reservoir 190 and 200 when the associated electric motors are suitably controlled. Corresponding control takes place during a pressure build-up phase of a brake pressure control, in order to suck hydraulic fluid from the respective reservoir 190, 200 by means of the assigned pump arrangement 160 or 170 and to feed the hydraulic fluid to the wheel brake via an open downstream valve to increase the brake pressure. The corresponding pump arrangement 160, 170 then acts as a hydraulic pressure generator, in addition to or in place of the assembly 110 for hydraulic pressure generation.

Corresponding control of one of the pump arrangements 160, 170 can also take place, however, if the hydraulic fluid in the corresponding reservoir 190, 200 has reached or exceeded a critical level. The critical level is a predetermined level, which is intended, for example, to ensure that the remaining free volume in the reservoir 190 or 200 is large enough to be able to accommodate the discharged hydraulic fluid in the event of a required brake pressure reduction on at least one of the two wheel brakes 130 during brake pressure control.

When the critical level wird is reached, the pump arrangement 160, 170 assigned to the corresponding reservoir 190, 200 is controlled in such a way that hydraulic fluid is sucked out of the reservoir 190 or 200 to ensure that there is sufficient free volume or sufficient free volume can be generated to store hydraulic fluid discharged from the wheel brake 130 to reduce the wheel brake pressure during a pressure reduction phase in the reservoir 190 or 200 taking place currently or subsequently.

The two electric motors of the pump arrangements 160, 170 can be controlled independently of each other. This means that each of the two pump arrangements 160, 170 can build up a hydraulic pressure in the respective brake circuit I. or II independently of the other pump arrangement 170 and 160 and can empty the corresponding reservoir 190 or 200 independently of each other. This redundancy is an optional feature of the brake system 100, but advantageous for safety reasons.

As shown in FIG. 1, the two brake circuits I. and II. are designed identically with respect to the components installed therein as well as the arrangement of these components. For this reason, only the structure and operation of the first brake circuit I. are explained in more detail below.

In the brake circuit I. a plurality of electromagnet-actuated valves is provided, which in the inactivated, i.e. electrically uncontrolled state, adopt the basic positions shown in FIG. 1. In these basic positions, the valves couple the assembly 110, in particular the master cylinder 110E with a pressure chamber 110F accommodating the tandem piston 110A, to the wheel brakes 130. Thus, even in the event of a loss of function (for example a failure) of the energy supply and a consequent failure of the electrically controllable actuator 110B or the valves, a hydraulic pressure can still be built up by the driver by means of the brake pedal 105 acting on the tandem piston 110A, without this being boosted by the electrically controllable actuator 110B.

The plurality of valves includes two 2/2-way valves 210 and 220, which allow the two wheel brakes 130A and 130B to be decoupled from the assembly 110. Specifically, the valve 210 is provided, when in the electrically activated state, to decouple the wheel brakes 130A, 130B from the assembly 110, and when in the electrically inactivated state the valve 220 is provided to decouple the wheel brakes 130A, 130B from the assembly 110, for example when a control intervention (pressure decrease) is carried out on at least one of the two wheel brakes 130A, 130B. The valve 220, when in its electrically activated state, enables the hydraulic fluid to be sucked in or sucked back from the reservoir 110G by the pump arrangement 160 (for example in the event of a long-lasting control intervention, if the reservoir 160 is completely emptied during this) or also, as is to be described later, the hydraulic fluid is discharged towards the reservoir 110G or the master cylinder 110E.

The hydraulic connection of the wheel brakes 130A, 130B to the assembly 110 and the pump arrangement 160 is determined by four 2/2-way valves 230, 240, 250, 260, which adopt the basic positions shown in FIG. 1 in the inactivated, i.e. electrically inactivated, state. This means that the two valves 230 and 260 each adopt their flow position, while the two valves 240 and 250 each adopt their blocking position. The two valves 230 and 240 form a first valve arrangement assigned to the wheel brake 130B, while the two valves 250 and 260 form a second valve arrangement assigned to the wheel brake 130A.

As explained below, the two valves 210 and 220, the two valve arrangements 230, 240 or 250, 260 and the pump arrangement 160 are each designed to be controlled for wheel brake pressure control interventions on the respective wheel brake 130A, 130B. The control of the two valves 210 and 220, the two valve arrangements 230, 240 and 250, 260 and the pump arrangement 160 in the context of the control interventions is carried out by means of a control system 300 (see also FIG. 2). The control system 300 implements, for example, the wheel brake pressure control interventions of driving dynamics control, wherein the driving dynamics control can include an anti-lock brake system (ABS). In addition, a drive slip control (ASR) and/or a brake pressure control for adaptive cruise control (ACC) and/or an electronic braking force distribution (EBV) may be included.

During anti-lock braking, it is important to prevent the wheels from locking during braking. For this purpose, it is necessary to modulate the hydraulic pressure in the wheel brakes 130A, 130B individually depending on the prevailing wheel slip. For determining wheel slip, for example, signals of wheel sensors are evaluated in a known manner. The ABS pressure modulation is carried out by setting in chronological sequence alternating pressure build-up, pressure holding and pressure reduction phases, which result from suitable control of the valve arrangements 230, 240 or 250, 260 assigned to the two wheel brakes 130B and 130A and, if necessary, of the pump arrangement 160.

During a pressure build-up phase, the valve arrangements 230, 240 or 250, 260 each adopt their basic position, so that an increase in the braking pressure in the wheel brakes 130A, 130B (as with BBW braking) can be carried out by means of the pump arrangement 160 in its function as a hydraulic pressure generator. For a pressure holding phase on one of the wheel brakes 130B or 130A, only the valve 230 or 260 is controlled, i.e. transferred to its blocking position. Since the valve 240 or 250 is not controlled, it remains in its blocking position. As a result, the corresponding wheel brake 130B or 130A is hydraulically decoupled, so that a hydraulic pressure in the wheel brake 130B or 130A is kept constant. In a pressure reduction phase, both the valve 230 or 260 and the valve 240 or 250 are controlled, so that the valve 230 or 260 is transferred to its blocking position and the valve 240 or 250 respectively to its flow position. Thus, hydraulic fluid can flow out of the wheel brake 130B or 130A towards the reservoir 190 in order to reduce a hydraulic pressure in the wheel brake 130A or 130B.

Other control interventions in normal braking mode are carried out in an automated manner and typically independently of the driver's operation of the brake pedal. Such automated control of wheel braking pressure is carried out, for example, in connection with a drive slip control, which prevents spinning of individual wheels during a start-up process by targeted braking, a driving dynamics control in the strict sense, which adapts the vehicle behavior in the limit region by selectively braking individual wheels according to the driver's wishes and the road conditions, or an adaptive speed control, which, among other things, maintains a distance between the vehicle concerned and the vehicle ahead.

When performing automatic hydraulic pressure control, a hydraulic fluid pressure can be built up on at least one of the wheel brakes 130A or 130B by controlling the pump arrangement 160. The valve arrangements 230, 240 or 240 250, 260 assigned to the wheel brakes 130B, 130A first adopt the basic positions illustrated in FIG. 1. A fine adjustment or modulation of the hydraulic fluid pressure can be carried out by corresponding adjustment of the pump arrangement 160 as well as the valves 230, 240 or 250, 260 assigned to the wheel brakes 130B or 130A, as explained above in connection with the ABS control by way of example.

Hydraulic pressure control is generally carried out by means of the control system 300 depending on the parameters detected by sensor that descriptively describe on the one hand the vehicle behavior (for example wheel revolution rates, yaw rate, lateral acceleration, etc.) and on the other hand parameters describing the driver's wishes and detected by sensor (for example operation of the brake pedal, steering wheel angle, etc.), if the latter are present. A deceleration demand of the driver can be determined, for example, by means of a travel sensor which is coupled to the brake pedal 105 or coupled to an input element of the tandem piston 110A. The brake pressure generated by the driver in the master cylinder 110E can be used alternatively or additionally as a measurement variable descriptive of the driver's wishes, which is detected by sensor and may be plausibility checked. The deceleration demand may also be initiated by a system for autonomous or semi-autonomous driving.

As already explained above, it is essential for the error-free and reliable functioning of the wheel brake pressure control device that the reservoir 190 is regularly emptied by means of the pump arrangement 160, so that a critical level with a high volume of hydraulic fluid in the reservoir 190 is not even reached. The critical level is a predetermined level, which provides that there is still sufficient free volume in the reservoir 190 for the accommodation of hydraulic fluid from the wheel brakes 130 assigned to the reservoir 190 during a pressure decrease phase. If the critical level is exceeded, only a very short duration wheel brake pressure control is possible until the reservoir 190 is completely filled. The wheels can be locked after that, for example during ABS control, because wheel brake pressure can no longer be quickly reduced in the reservoir 190.

However, if there is a loss of function of the pump arrangement 160, for example due to the failure of the electric motor of the pump arrangement 160, locking of the gearbox downstream of the electric motor, faulty control of the electric motor etc., the reservoir 190 is no longer emptied (or possibly only insufficiently) and a critical level in the reservoir will be reached and/or even exceeded.

According to the present exemplary embodiment, in the event that a loss of function of the pump arrangement 160 is detected and at the same time reaching or exceeding the critical level in the reservoir 190 is detected, it is provided that the control system 300 controls the electrically controllable actuator 110B in such a way that the tandem piston 110A is driven back in the pressure chamber 110F, i.e. is shifted to the right relative to FIG. 1. By driving the piston 110A back in the pressure chamber 110F, the hydraulic fluid pressure in the pressure chamber 110F decreases. The pressure decrease in the chamber 110F causes hydraulic fluid to be sucked from the reservoir 190 (via the opened valve 220)

towards the pressure chamber 110F and into the pressure chamber 110F and the reservoir 190 is thereby partially emptied, as illustrated by the arrow 195 in FIG. 1. The suction of hydraulic fluid is favored by the fact that the reservoir 190 is in the form of a pressure accumulator.

During this pressure release sequence (PRS), which accompanies or interrupts the normal wheel brake pressure control, the valve 220 is switched into its open position in order to achieve a maximum volumetric flow of hydraulic fluid. A hydraulic flow back into the pressure chamber 110F just via the pump arrangement 160 and the valve 210 would be relatively slow due to the blocking valves 180 assigned to the pump arrangement 160. Sometimes, the pump arrangement 160 has a hydraulic blocking effect due to the loss of function. In total, the hydraulic flow therefore takes place at least partially through a bypass line 215 bypassing the pump arrangement 160.

During the pressure release sequence, both the valve 210 and the valve 220 can be open. Alternatively, especially if not all wheels 130 are in slip, both valves 210 and 220 are controlled in such a way that the valve 220 is open and the valve 210 is closed, so that the hydraulic fluid flows back exclusively through the bypass line 215. By means of the valve 210 which is closed during the pressure release sequence, if not all wheels 130 are in slip the wheel brake pressure of the stable wheel or wheels can be maintained and a subsequent deceleration decrease following the pressure release sequence due to empty or partially emptied hydraulic lines can be prevented or at least reduced.

According to the present exemplary embodiment, therefore, if there is a detected loss of function of one of the pump arrangements 160 and 170 and the critical level is reached or exceeded in the reservoir 190 or 200 during a wheel brake pressure control, the normal wheel brake pressure sequence described above is interrupted briefly if necessary and the electric actuator 110B is controlled so that the tandem piston 110A is driven back. If the reservoir 190 or 200 is emptied or at least partially emptied, so that the level is below the critical level, the wheel brake pressure control can be carried out again according to the sequence described above. For this purpose, the valve 220, which is opened when the piston 110A is being driven back, is usually switched back to the inactivated, closed state. Hysteresis can be taken into account by emptying the reservoir 190 or 200 to well below the critical level (for example complete emptying).

In the case of a detected loss of function of the pump arrangement 160 or 170, the brake pressure control is not degraded or deactivated or rendered unavailable in the present exemplary embodiment but continues to be carried out or provided normally. Only when it is detected during brake pressure control that the reservoir 190 or 200 has reached or exceeded a critical level is the above-described pressure release sequence initiated, in which the piston 110A is driven back in the pressure chamber 110F with suction of hydraulic fluid, and this is carried out until the reservoir 190 or 200 is emptied or at least partially emptied. Afterwards, the conventional wheel brake pressure control takes place again, whereby the pressure is provided during the pressure build-up phase by means of the assembly 110 for hydraulic pressure generation. During the wheel brake pressure control there is no danger of locking wheels 130 due to a full reservoir 190 or 200, as long as the level remains below the critical level. If the critical level is reached again, the conventional wheel brake pressure control is interrupted again, and a new pressure release sequence is triggered. A typical time span for such a pressure release sequence is about 500 ms (generally between 50 ms and 2 s).

Using a mathematical model showing the level of the reservoir 190 or 200, as described according to an example below, and the amount of hydraulic fluid sucked in from the reservoir 190 or 200, which can be determined from the distance travelled by the piston 110A and the area of the piston 110A, it can be determined whether the reservoir 190 or 200 is empty. Thus, the pressure release sequence described above can be terminated if the volume of the hydraulic fluid sucked in corresponds to the volume of the hydraulic fluid in the reservoir 190 or 200 or at least the filling volume is again below the critical filling quantity.

The procedure described above with the device described above is particularly advantageous if a functional failure of the pump arrangement 160 or 170 occurs during an autonomous driving mode. Vehicle stability can be fully maintained with the procedure described above. This is of particular importance in autonomous driving, where the driver does not intervene in a compensating and/or controlling manner.

In an EBB system, if the driver takes control of the vehicle during autonomous driving, no pressure release sequence can normally be carried out with driving the piston 110A back, since in EBB mode the brake pedal 105 should not be driven back against the force of the driver. In this case, conventional fallback strategies are then used in the event of a detected loss of function of the wheel brake pressure control device.

The electrically controllable actuator 110B can also be part of a BBW system. In this case, the actual service brake force is generated by means of the electrically controllable actuator. The brake pedal can be mechanically decoupled from the piston in BBW mode, for example. Mechanical decoupling can be removed, for example in the event of a fault in the BBW system (push-through, PT, operation).

In both cases, the service brake force can be demanded by a driver on the brake pedal 105. In the BBW system, the deceleration demand executed by means of the brake pedal 105 can be detected by sensor. The actuator 1106 is then electrically controlled according to the sensor signal. In the case of a BBW system, if the driver takes back control of the vehicle during autonomous driving, the pressure release sequence can be continued with driving the piston 110A back if the pedal is decoupled from the piston 110A.

Figure 2:
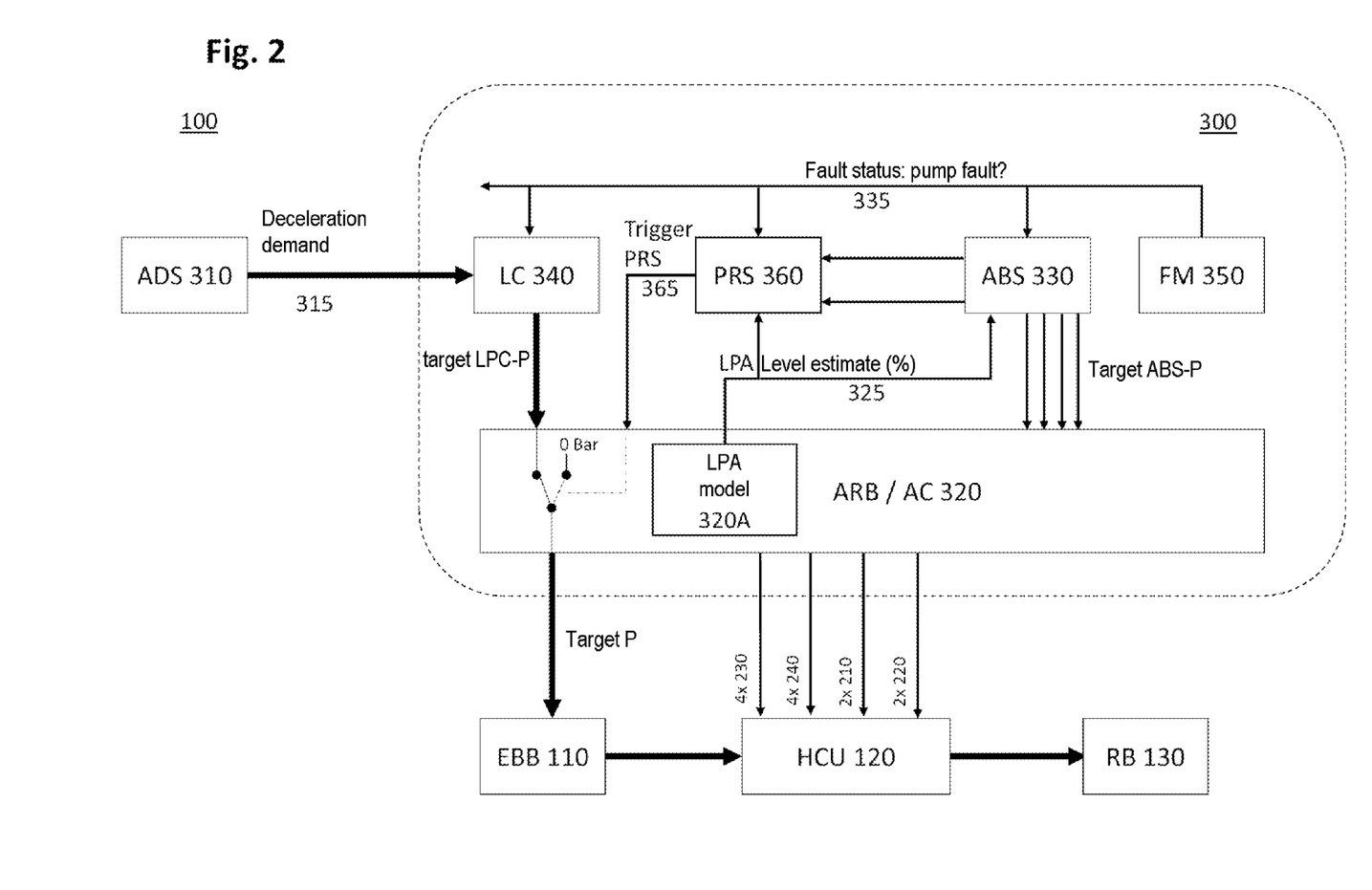
FIG. 2 shows an exemplary embodiment of a control system for the brake system in accordance with FIG. 1.

FIG. 2 shows an exemplary embodiment of a control system 300 as shown in FIG. 1, which is designed, among other things, to control the electrically controllable actuator 1106 for driving the piston 110A back. In FIG. 2, the control system is designed as a control unit system 300 with a number of control units. The control unit system 300 can be designed as a spatially connected control unit. The individual control units can thus be housed in a common housing but have separate processors for processing measurement variables and for controlling respective assigned components. Alternatively to this, however, at least some of the plurality of control units of the control system can also be accommodated in different housings.

The control unit system 300 of FIG. 2 is shown in conjunction with a control unit 310, which is assigned to an autonomous driving system (ADS) and which is designed to communicate control signals and/or measurement variables generated within the context of an autonomous driving mode and/or a partially autonomous driving mode to the control unit system 300. An example of a control signal is a deceleration demand initiated by the autonomous system, which is to be implemented by the brake system 100 according to FIG. 1.

The control unit system 300 has a first control unit 320, which is designed to control the EBB actuator 110B and the individual components of the hydraulic control unit 120, in particular the valves 210, 220, 230, 240, 250 and 260 and the pump arrangements 160, 170. The first control unit 320 is designed to exchange data (such as measurement variables) and control signals with other control units of the control unit system 300 and depending thereon to output corresponding control signals to the EBB actuator 110B and the hydraulic control unit 120.

A second control unit 330 of the control unit system, which is communicatively coupled to the first control unit 320, is the wheel brake pressure control system, for example an ABS logic. The functionality of the second control unit 330 can also be integrated into the first control unit 320.

The second control unit 330 is designed to detect the need for wheel brake pressure control and the type of wheel brake pressure control (a pressure build-up, maintaining a pressure or a pressure reduction as described with reference to FIG. 1) on the basis of a plurality of measurement variables detected by sensor, and to output to the first control unit 320 corresponding control signals for the HCU 120 as well as certain target values, such as target values for the wheel brake pressure on the individual vehicle wheels 130. The detection of a control intervention requirement can be carried out by evaluating wheel signals detected by wheel sensors such as wheel revolution rates or wheel speeds, which indicate the revolution rate or velocity of the corresponding wheel. Also other parameters such as yaw rate, steering angle, lateral and/or longitudinal acceleration, can be used additionally or alternatively for the detection of a control intervention requirement.

Based on the wheel signals, in particular a wheel-related slip detection and slip control can be carried out by the ABS control unit 330. The wheel slip is a measure of a deviation of the individual wheel speed from the vehicle speed. From a certain value at which a maximum braking force is reached, the wheel slip continues to increase as the braking force decreases until the wheel finally locks.

A deceleration demand independent of the wheel brake pressure control is implemented by a third control unit 340 of the control unit system 300. The third control unit 340 is communicatively coupled to the first control unit 320. The functionality of the third control unit 340 can also be integrated into the first control unit 320.

The third control unit 340 may, for example, be assigned to a driver assistance system that detects whether deceleration of the vehicle is necessary on the basis of various sensor-recorded measures and/or available parameters that describe the environment (such as the data of a navigation system). Situations that make deceleration necessary regardless of a deceleration demand initiated by the driver can be, for example, an obstacle suddenly detected on the road, too little distance to a car ahead and a road layout that the driver has not foreseen and has not taken into account. Examples of suitable sensors for detecting such a situation can be distance sensors, motion sensors, steering angle sensors, etc.

If the third control unit 340 detects the need for deceleration or if the third control unit 340 receives a deceleration demand (for example from the ADS 310), this demand is implemented by requesting a target system pressure (target longitudinal control pressure, LC-P-Soll), which is passed on to the EBB system 110 via the first control unit 320 (P-Soll). The target system pressure is then provided by the EBB system 110 by moving the piston 110A accordingly. The third control unit 340 is designated with LC (Longitudinal Control) here, which is descriptive of the fact that the control unit 340 is set up to control the longitudinal direction-related parameter of the vehicle (such as the distance to vehicles ahead).

If the deceleration demand is made by the autonomous system 310 (ADS) within the context of autonomous and/or semi-autonomous driving, as indicated by the arrow 315, the third control unit 340 also implements this deceleration demand by requesting a target system pressure, which is passed on to the EBB system 110 by the first control unit 320.

A fourth control unit 350 of the control unit system 300 is designed to detect an occurring malfunction of the hydraulic control group 120 (failure management, FM). The functionality of the fourth control unit 350 can also be integrated into the first control unit 320.

The fourth control unit 350 is in particular able to detect a loss of function of the wheel brake pressure control device and in particular of the pump arrangements 160, 170 of FIG. 1. The fourth control unit 350 may also be designed to detect further malfunctions of a system described with reference to FIG. 1 that lie outside the hydraulic control unit 120, such as the failure of a sensor, a loss of function of the assembly 110, etc.

As described above with reference to FIG. 1, a failure of the pump arrangement 160, 170 leads to the fact that the reservoirs 190, 200 assigned to the front and rear wheel brakes 300 are no longer emptied during ABS control. As a result, only brief ABS control is possible until the reservoirs 190, 200 are completely filled and wheel brake pressure can no longer be reduced, which leads to locking of the wheel or wheels 130.

A loss of function of one of the pump arrangements 160, 170 is noticeable during control in that the wheel brake pressure control is no longer working due to a (practically) completely filled reservoir 190, 200. As described above with regard to the second control unit 330, the brake pressure control intervention requirement can be detected by the second control unit 330 on the basis of a determination of wheel slip. As a result, it can be determined on the basis of the wheel slip determination, in particular based on the wheel slip variation with time, whether the wheel brake pressure control intervention is feasible or not. Thus, on the basis of a characteristic wheel slip variation for at least one wheel, i.e. on the basis of the determined wheel slip as a function of time, reaching and/or exceeding a critical filling volume of the respective reservoir 190, 200 can be detected by the second control unit 330.

A characteristic wheel slip variation, which indicates a reservoir 190, 200 filled with hydraulic fluid, can be a rapid rise of a wheel slip value from a predetermined wheel slip value. The predetermined wheel slip value can be a known value at which a braking force maximum is usually achieved, for example.

A first possibility for detecting a critical filling volume of the reservoir 190, 200 with hydraulic fluid is therefore based on a characteristic wheel slip variation. A second possibility for detecting the critical filling volume of the reservoir 190, 200 is based on a mathematical model that models the filling volume. The calculation of the mathematical model is carried out by the first control unit 320 in the embodiment of FIG. 2 (see block "LPA Model" 320A). The calculated values, which represent the level, are transmitted to the second control unit 330 assigned to the brake pressure control system, as indicated by the arrow 325 in FIG. 2. The second control unit 330 is designed to detect the critical level on the basis of the transmitted values.

The mathematical model may be based, for example, on the assumption that the difference of the volumetric flow of hydraulic fluid flowing from the pressure chamber 110F (see FIG. 1) towards the wheel brakes 130 (input volumetric flow), and the volumetric flow of hydraulic fluid which is discharged from the wheel brakes 130 back into the pressure chamber 110F (output volumetric flow), corresponds to the filling volume of the reservoir 190 or 200. The input parameters of the model for determining the input volumetric flow can be characteristic parameters of one or more valves, via which the pressure chamber 110F can be coupled to the wheel brakes, such as the control time of the corresponding valve or of the corresponding valves and the duration for which the corresponding valve or the corresponding valves is or are opened, as well as a signal of a pressure sensor which is arranged in the input or output line of the pressure chamber. In the case of the arrangement of FIG. 1, the control period or the control time point of the valve 220 would be decisive for this, as well as the period in which the valve 210 (which is normally open) is not controlled. A pressure sensor for reading a pressure signal is designated by the reference character 216 in FIG. 1.

The input parameter or an input parameter of the model for determining the output volumetric flow may be the flow rate of the pump 160 or 170, via which hydraulic fluid is discharged back from the wheel brakes 130 towards the pressure chamber 110F. The pump revolution rate is representative of the flow rate, for example.

The first and the second possibilities (or another possibility) for detecting a critical filling volume can be used as an alternative to each other. However, they can also be applied jointly. In this case, for example, the calculation of the critical level based on the characteristic wheel slip variation can provide redundancy in the event that the mathematical model is based on an incorrect assumption or is otherwise faulty.

The second control unit 330, which is assigned to the brake pressure control, can thus detect reaching the critical level based on the transmitted values. Alternatively or additionally, the second control unit 330 is designed to detect reaching and/or exceeding a critical filling volume of the respective reservoir on the basis of a characteristic wheel slip variation for at least one vehicle wheel 130. Furthermore, the second control unit 330 receives a corresponding signal from the fourth control unit 350, if a loss of function is detected of the wheel brake pressure control device and in particular of the pump arrangements 160, 170 of FIG. 1, as indicated by the arrow 335.

The second control unit 330 is designed to detect an optimal time for a pressure release sequence on the basis of the transmitted signals and/or calculated values. In particular, a pressure release sequence is initiated when there is a detected loss of function of the brake pressure control, in particular of the pump arrangement 160, 170, and if reaching a critical level in one or more of the reservoirs 190, 200 was additionally detected.

Demanding (i.e. triggering) a pressure release sequence is schematically represented in FIG. 2 by the function block 360 (pressure release sequence, PRS). The functionality of the function block 360 can also be integrated into the first control unit 320.

As an optional feature, the function block 360 is coupled to the control unit 330 via two separate lines, via a software-based interface, or otherwise. This coupling allows the control unit 330 (the functionality of which, as mentioned, can also be integrated into the first control device), to selectively enable the function block 360 for signal output, i.e. to "unlock" (by means of an Enable PRS signal), or to trigger its signal output directly and unconditionally (by means of a Force PRS signal).

If a pressure release sequence is demanded by means of block 360, as illustrated by the arrow 365, the demand for a target system pressure for implementing a deceleration demand output to the EBB system 110 by the third control unit 340, i.e. a detected need for deceleration, is briefly reduced to 0 bar by the first control unit 320. During the pressure release sequence, in which the target system pressure is set to 0 bar, the target system pressure demanded by the third control unit 340 (either due to a corresponding deceleration demand of the autonomous system or due to a need for deceleration detected by the third control unit 340) is temporarily ignored, for example. The target system pressure of 0 bar is then provided by the EBB system 110 by driving the piston 110A back, whereby at least partial emptying of one or both reservoirs 190, 200 takes place (as explained above in connection with FIG. 1). After the pressure release sequence has been terminated, the target system pressure demanded by the third control unit 340 is implemented again. It is understood that instead of a target system pressure of 0 bar, a higher target system pressure can also be demanded, as long as driving the piston 110A back and at least partial emptying of one or both reservoirs 190, 200 can be accomplished thereby.

Figure 3:
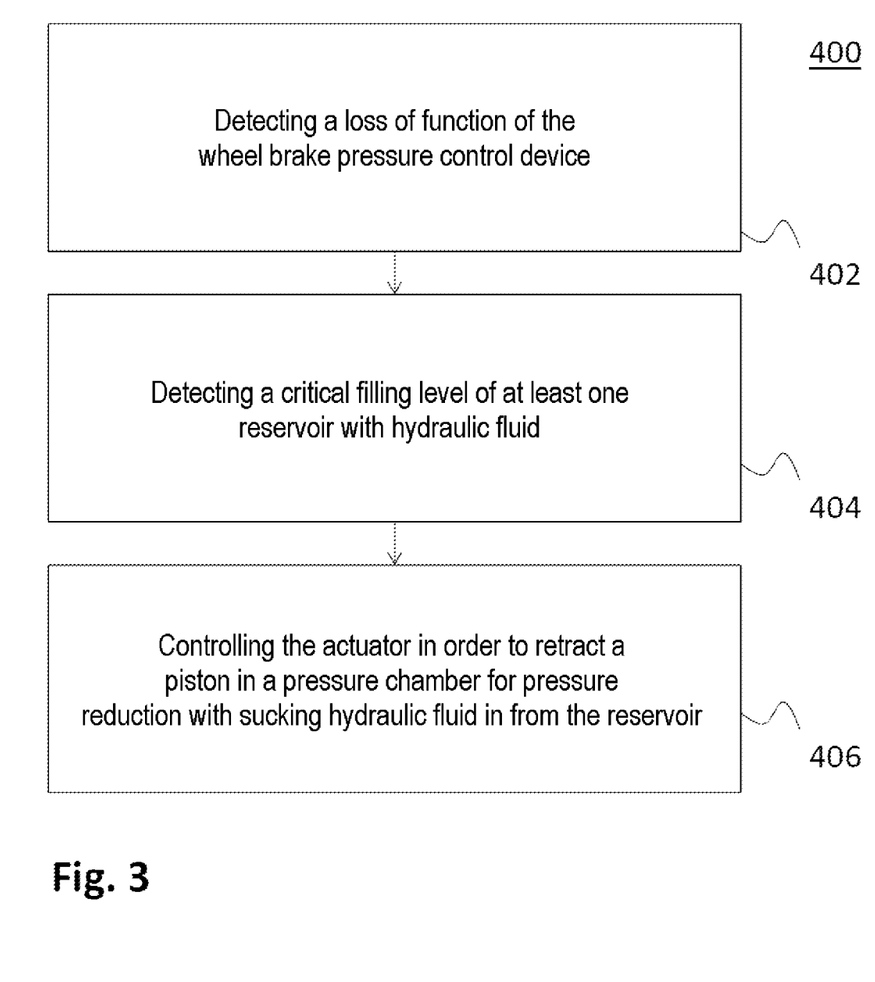
FIG. 3 shows a flow diagram of an exemplary embodiment of a method for operating the brake system according to FIG. 1.

An exemplary embodiment of a method 400 for operating the brake system 100 in accordance with FIG. 1 is described below with reference to the flowchart according to FIG. 3. The method 400 can be carried out by means of the control unit system 300 shown in FIG. 2 or by an otherwise configured control unit system.

The method starts in step 402 with the detection of a loss of function of the wheel brake pressure control device. For example, the failure of one or more of the pump arrangements 160, 170 of FIG. 1 can be detected. The loss of function can be detected by the fourth control unit 350 of FIG. 2.

After detecting the loss of function in step 402 (or even before or at the same time) it is recognized in step 404 that at least one reservoir 190, 200 is filled with a critical filling volume of hydraulic fluid, whereby a functioning wheel brake pressure decrease, as described in detail above with reference to FIGS. 1 and 2, is no longer ensured.

Only when the conditions according to step 402 and 404 are both met, is step 406 performed, whereby the electrically controllable actuator 110B is controlled to drive the piston 110A back in the pressure chamber 110F for pressure reduction with suction of hydraulic fluid from the reservoir. In the case of the brake system of FIG. 1, when the piston 110A is being driven back the valve 220 is in a controlled, i.e. open, state, in order to ensure the return flow via the bypass line 215. The valve 210 is either open or closed. Step 406 is performed until the reservoir is emptied or at least partially emptied.

Step 406 can be performed in parallel or independently of a wheel brake pressure control and in parallel with or independently of a service braking or other braking. Thus, although a braking pressure may be applied to the wheel brakes 406 during step 406, this is not a prerequisite for carrying out the method 400.

After emptying or partial emptying of the reservoir 190, 200 to below the critical filling volume by sucking in hydraulic fluid in step 406, normal wheel brake pressure control of the control device can be initiated or continued.

With the solution described in the exemplary embodiments, emptying of the reservoirs 190, 20 is ensured even if there is a failure or impairment of the control device 120.

The invention claimed is:

1. A hydraulic motor vehicle brake system (100), comprising:
    a device (110) for generating a hydraulic fluid pressure with an electrically controllable actuator (110B) and a piston (110A) in a pressure chamber (110F) which can be moved by means of the electrically controllable actuator (110B) for changing a hydraulic fluid pressure in the pressure chamber (110F),
    a wheel brake pressure control device (120) with a reservoir (190, 200) for storing hydraulic fluid discharged from a motor vehicle wheel brake (130) in a pressure reduction phase, wherein the reservoir (190, 200) is fluidically coupled to the pressure chamber (110F), and
    a control system (300) which, when a loss of function of the control device (120) is detected and a critical filling volume of the reservoir (190, 200) with hydraulic fluid is detected during operation of the control device (120), is designed to output a control signal for the actuator (110B) which causes the piston (110A) to be driven back for pressure reduction in the pressure chamber (110F) by sucking hydraulic fluid from the reservoir (190, 200).

2. The brake system (100) as claimed in claim 1, wherein the detected loss of function is the failure of a pump arrangement (160, 170) which is provided to discharge hydraulic fluid from the reservoir (190, 200).

3. The brake system (100) as claimed in claim 2, wherein the wheel brake pressure control device (120) is designed to discharge the hydraulic fluid in the reservoir (190, 200) by means of the pump arrangement (160, 170) during a pressure build-up phase to increase the wheel brake pressure.

4. The brake system (100) as claimed in claim 2, wherein the wheel brake pressure control device (120) is set up to fluidically connect the reservoir (190, 200) to the pressure chamber (110F) so that at least part of the hydraulic fluid sucked in when the piston (110A) is driven back flows through a bypass line (215) which bypasses the pump arrangement (160, 170).

5. The brake system (100) as claimed in claim 4, wherein the wheel brake control device (120) is set up to fluidically connect the reservoir (190, 200) to the pressure chamber (110F) so that the hydraulic fluid sucked in when the piston (110A) is driven back flows exclusively through the bypass line (215).

6. The brake system (100) as claimed in claim 1, wherein the reservoir (190, 200) is a pressure storage device.

7. The brake system (100) as claimed in claim 1, wherein the control system (300) is designed to detect reaching the critical filling volume of the reservoir (190, 200) with hydraulic fluid on the basis of slip determination for a vehicle wheel.

8. The brake system (100) as claimed in claim 7, wherein the control system (300) is designed to carry out the slip determination on the basis of at least one parameter measured on the respective vehicle wheel (VL, VR, HL, HR).

9. The brake system (100) as claimed in claim 1, wherein the control system (300) is designed to detect reaching the critical filling volume of the reservoir (190, 200) on the basis of a mathematical model modelling the filling volume.

10. The brake system (100) as claimed in claim 1, wherein the control system (300) is designed to detect the loss of function of the control device (120).

11. The brake system (100) as claimed in claim 1, wherein the control system (300) is designed to cause normal wheel brake pressure control of the control device (120) after emptying or partial emptying of the reservoir (190, 200) to below the critical filling volume by sucking in hydraulic fluid when the piston is being driven back (110A) in the pressure chamber (110F).

12. The brake system (100) as claimed in claim 1, wherein the electrically controllable actuator (110B) is part of an EBB system (110) and the actuator (110B) is controlled in an autonomous driving mode.

13. The brake system (100) as claimed in claim 1, wherein the wheel brake pressure control device (120) comprises an ABS device.

14. A method for operating a hydraulic motor vehicle brake system (100) which has a device for generating a hydraulic pressure with an electrically controllable actuator and a piston in a pressure chamber, which can be moved by means of the electrically controllable actuator for changing a hydraulic pressure in the pressure chamber, as well as a wheel brake pressure control device with a reservoir for the storage of hydraulic fluid discharged from a motor vehicle wheel brake in a pressure reduction phase, wherein the reservoir is fluidically coupled to the pressure chamber, wherein the method includes the following step in the event of a detected loss of function of the control device (120) and in the event of a detected critical filling volume of the reservoir with hydraulic fluid during operation of the control device (120):
    electric control of the actuator to drive the piston back in the pressure chamber for pressure reduction in the pressure chamber with suction of hydraulic fluid from the reservoir.

15. The method as claimed in claim 14, wherein normal wheel brake pressure control of the control device is initiated after emptying or partial emptying of the reservoir to below the critical filling volume by sucking in hydraulic fluid while the piston is being driven back in the pressure chamber.

16. A control unit (300) or a system of multiple control units (320, 330, 340, 350, 360), comprising at least one processor and at least one memory, wherein the at least one memory contains program code for performing the method as claimed in claim 14 when this is running on the at least one processor.

* * * * *